(12) United States Patent
Lin et al.

(10) Patent No.: US 8,235,600 B2
(45) Date of Patent: Aug. 7, 2012

(54) METHOD FOR MANUFACTURING ONE-PIECE LC TYPE OPTICAL FIBER ADAPTER

(75) Inventors: I En Lin, Sinjhuang (TW); Tomoyuki Mamiya, Marlboro, MA (US)

(73) Assignees: Protai Photonic Co. Ltd. (TW); Senko Advanced Components, Inc., Marlboro, MA (US)

( * ) Notice: Subject to any disclaimer, the term of this patent is extended or adjusted under 35 U.S.C. 154(b) by 347 days.

(21) Appl. No.: 12/689,226

(22) Filed: Jan. 18, 2010

(65) Prior Publication Data
US 2010/0146764 A1 Jun. 17, 2010

Related U.S. Application Data

(63) Continuation-in-part of application No. 12/199,581, filed on Aug. 27, 2008, now abandoned.

(51) Int. Cl.
*G02B 6/36* (2006.01)
(52) U.S. Cl. .......................... 385/55; 385/53
(58) Field of Classification Search .................. None
See application file for complete search history.

(56) References Cited

U.S. PATENT DOCUMENTS

| | | | |
|---|---|---|---|
| 5,317,663 A * | 5/1994 | Beard et al. | 385/70 |
| 5,481,634 A * | 1/1996 | Anderson et al. | 385/76 |
| 7,972,066 B1 * | 7/2011 | Lin et al. | 385/55 |
| 2009/0060422 A1 * | 3/2009 | Lin et al. | 385/78 |
| 2010/0239220 A1 * | 9/2010 | Lin et al. | 385/134 |

* cited by examiner

*Primary Examiner* — Mike Stahl (57) ABSTRACT

The present invention generally relates to a method for manufacturing a one-piece LC type optical fiber adapter, more particularly to a method that is simpler and easier to assemble the LC type optical fiber adapter.

8 Claims, 6 Drawing Sheets

METHOD FOR MANUFACTURING ONE-PIECE LC TYPE OPTICAL FIBER ADAPTER

CROSS-REFERENCE TO RELATED APPLICATION

This application is a continuation-in-part of a co-pending U.S. patent application Ser. No. 12/199,581 for "ONE-PIECE LC TYPE OPTICAL FIBER ADAPTER" filed Aug. 27, 2008. The content of which is incorporated by reference in its entirety.

BACKGROUND OF THE INVENTION

1. Field of the Invention

The present invention generally relates to a method for manufacturing a one-piece LC type optical fiber adapter, more particularly to a method that is simpler and easier to assemble the LC type optical fiber adapter.

2. Description of the Prior Art

Fiber optics has revolutionized communication through out the world. With the increased used of fiber optics it has become increasingly important to be able to connect and disconnect fiber optic cables from various sources. Two fiber optic cables can be optically coupled so that they are in communication with each other by using connectors and an adapter, thereby putting each fiber optic cable in communication with the other. The connectors are placed on the end of each cable and then plugged into the adapter. The adapter has two openings each one designed to receive a connector.

The conventional LC type adapter consists of two halves, each halve being identical. Each half consists generally of a rectangular cylinder having a flange at one end. Inside each half would be placed half of an inner housing. The inner housing is generally a round cylinder with a flange at one end. Each adapter half has a ridge located just inside from its flange so that the inner housing could be placed in the adapter through the opening proximate to the flange on the adapter half. Once the inner housing is inserted into each adapter half, the two halves are connected by ultrasonically welding the two flanges of the adapter halves together.

However, the above design presents serious problems. The cables are naturally flexed in use when the adapter remains fixed. The related stress of this situation can cause the two halves of the adapter to separate from each other after time. In the prior art, this problem can be solved by constructing the adapter halves from metal which gives the adapter enough strength to withstand these stresses. However, this too presented a problem as metal is much more expensive to purchase and mold than the plastic one.

Accordingly, there exists a need to provide an LC type optical fiber adapter so as to develop a method for manufacturing the LC type optical fiber adapter for solving the aforesaid problems.

SUMMARY OF THE INVENTION

It is an object of the present invention to provide a method for manufacturing a one-piece LC type optical fiber adapter that has fewer parts than a conventional one. The method is simpler and easier to assemble the LC type adapter of the present invention. In addition, the main body of the LC type adapter is unitary thereby avoiding the prior art problem that the stresses cause the two halves of the adapter to separate from each other after time.

In order to achieve the above object, the method for manufacturing the one-piece LC type optical fiber adapter comprises the steps of:

(1) providing a main body having an axial cavity, which is defined by a top side-wall, a bottom side-wall, a right side-wall, and a left side-wall;

(2) dividing the axial cavity into two halves through a compartment wall, which is parallel to the right side-wall and left side-wall and connected with the top side-wall and bottom side-wall and has a surface;

(3) forming the half of the axial cavity, a right axial cavity, through the top side-wall, bottom side-wall, compartment wall, and right side-wall, wherein a first right opening and a second right opening are formed at the two ends of the right axial cavity respectively;

(4) forming the other half of the axial cavity, a left axial cavity, through the top side-wall, bottom side-wall, compartment wall, and left side-wall, wherein a first left opening and a second left opening are formed at the two ends of the left axial cavity respectively;

(5) forming a pair of tabs on the exterior of the main body, wherein the one tab is on the right side-wall and the other tab is on the left side-wall;

(6) forming a pair of parallel ridges on the inner surface of the bottom side-wall of the axial cavity of the main body so as to define a groove, wherein the ridges and the groove are perpendicular to the bottom side-wall and divide the compartment wall into two halves, the groove being located at the middle between the first openings and the other middle between second openings of the main body;

(7) forming two grooves on the right side-wall and left side-wall respectively, wherein the two grooves are collinear with the groove;

(8) forming four pairs of protrusions, wherein the first pair of protrusions are at the locations near the right opening on the joint of the right side-wall with the bottom side-wall and on the joint of the compartment wall with the bottom side-wall, the second pair of protrusions being at the locations near the left opening on the joint of the left side-wall with the bottom side-wall and on the joint of the compartment wall with the bottom side-wall, the third pair of protrusions being at the locations near the right opening on the joint of the right side-wall with the bottom side-wall and on the joint of the compartment wall with the bottom side-wall, and the fourth pair of protrusions being at the locations near the left opening on the joint of the left side-wall with the bottom side-wall and on the joint of the compartment wall with the bottom side-wall;

(9) forming an access opening on the top side-wall, wherein the location of the access opening is corresponding to the two tabs;

(10) providing two inner housing halves that can be inserted into the axial cavity of the main body through the access opening, wherein the two inner housing halves are identical, each half comprising at least two hollow cylinders, a flange located at the two ends of the same side of the cylinders, the thickness of the two flanges of combining the two inner housing halves being equal to the widths of the grooves;

(11) providing two sleeves, wherein the two cylinders of each of the inner housing halves are coaxial in the main body and define two cylinders, and the two hollow sleeves being accommodated in the cylinders respectively;

(12) combining the inner housing halves;

(13) disposing the combined inner housing halves in the main body through aligning the flange of the inner housing half with collinear grooves; and (14) integrating a cover to the access opening of the main body, wherein the cover comprises a bottom surface, the surface of the compartment wall being firmly attached to the bottom surface.

Other and further features, advantages, and benefits of the invention will become apparent in the following description taken in conjunction with the following drawings. It is to be understood that the foregoing general description and following detailed description are exemplary and explanatory but are not to be restrictive of the invention. The accompanying drawings are incorporated in and constitute a part of this application and, together with the description, serve to explain the principles of the invention in general terms. Like numerals refer to like parts throughout the disclosure.

BRIEF DESCRIPTION OF THE DRAWINGS

The objects, spirits, and advantages of the preferred embodiments of the present invention will be readily understood by the accompanying drawings and detailed descriptions, wherein.

DETAILED DESCRIPTION OF THE INVENTION

Following preferred embodiments and figures will be described in detail so as to achieve aforesaid objects.

Figure 1:
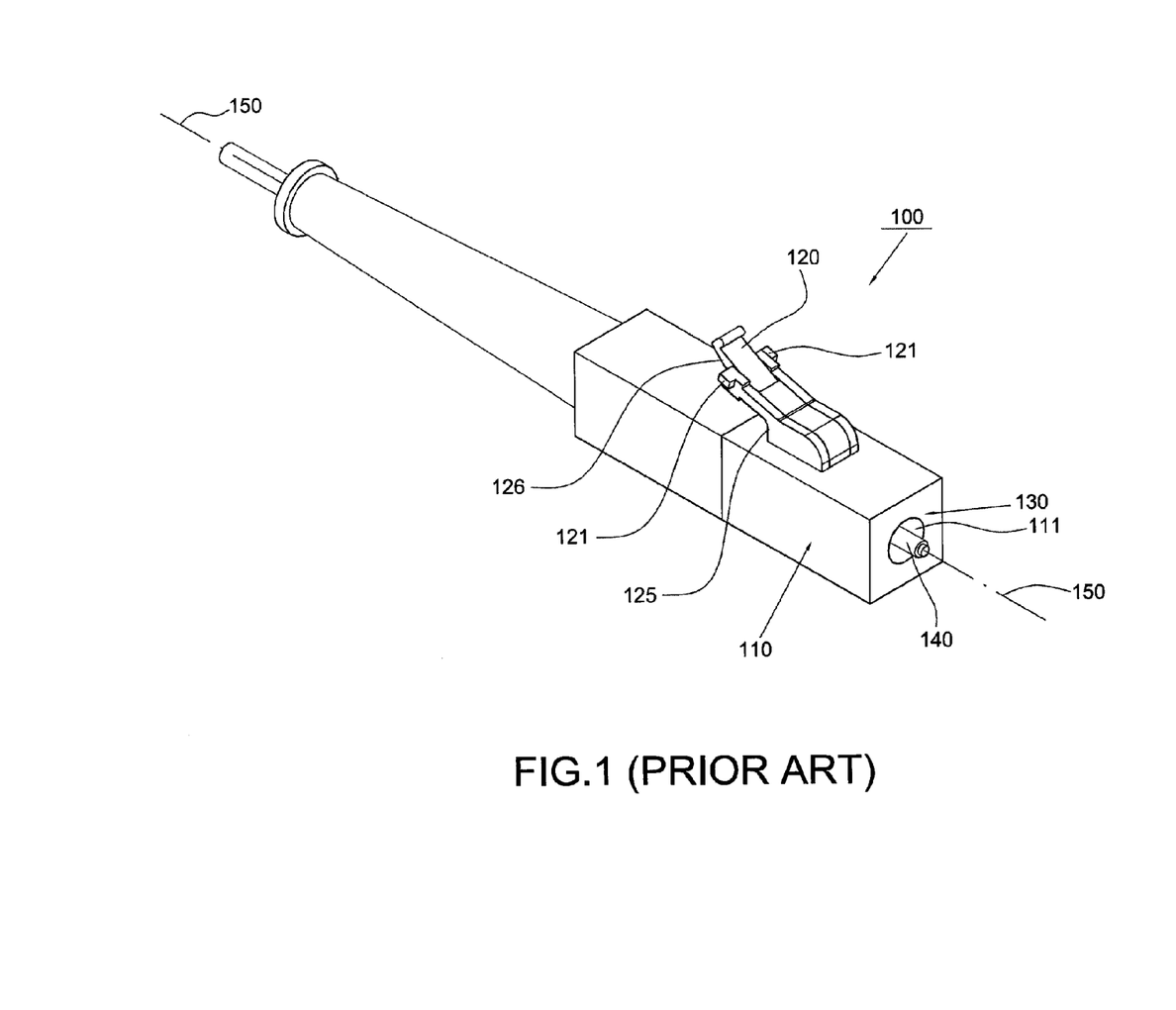
FIG. 1 is an elevated perspective view of a conventional LC type fiber adapter.

Referring to FIG. 1, a conventional LC type fiber connector 100 has a generally rectangular shape with a square cross section. The outer surface of the connector 100 includes a spring latch 120. The spring latch 120 is molded into the outer housing of the connector and includes a living hinge 125 which allows tab 126 to be moved up and down in a direction perpendicular to the central axis 150-150 of the connector 100. In addition, a ferrule 140 protrudes from the opening 111 of a two-piece assembly comprising housing 110 and cover 130 which have been ultrasonically bonded together. A spring (not shown in the figure) is located inside the two-piece assembly to allow the ferrule 140 to move back and forth through the opening 111. The spring latch 120 includes a pair of shoulders 121 that are positioned on opposite sides of the tab 126.

Figure 2:
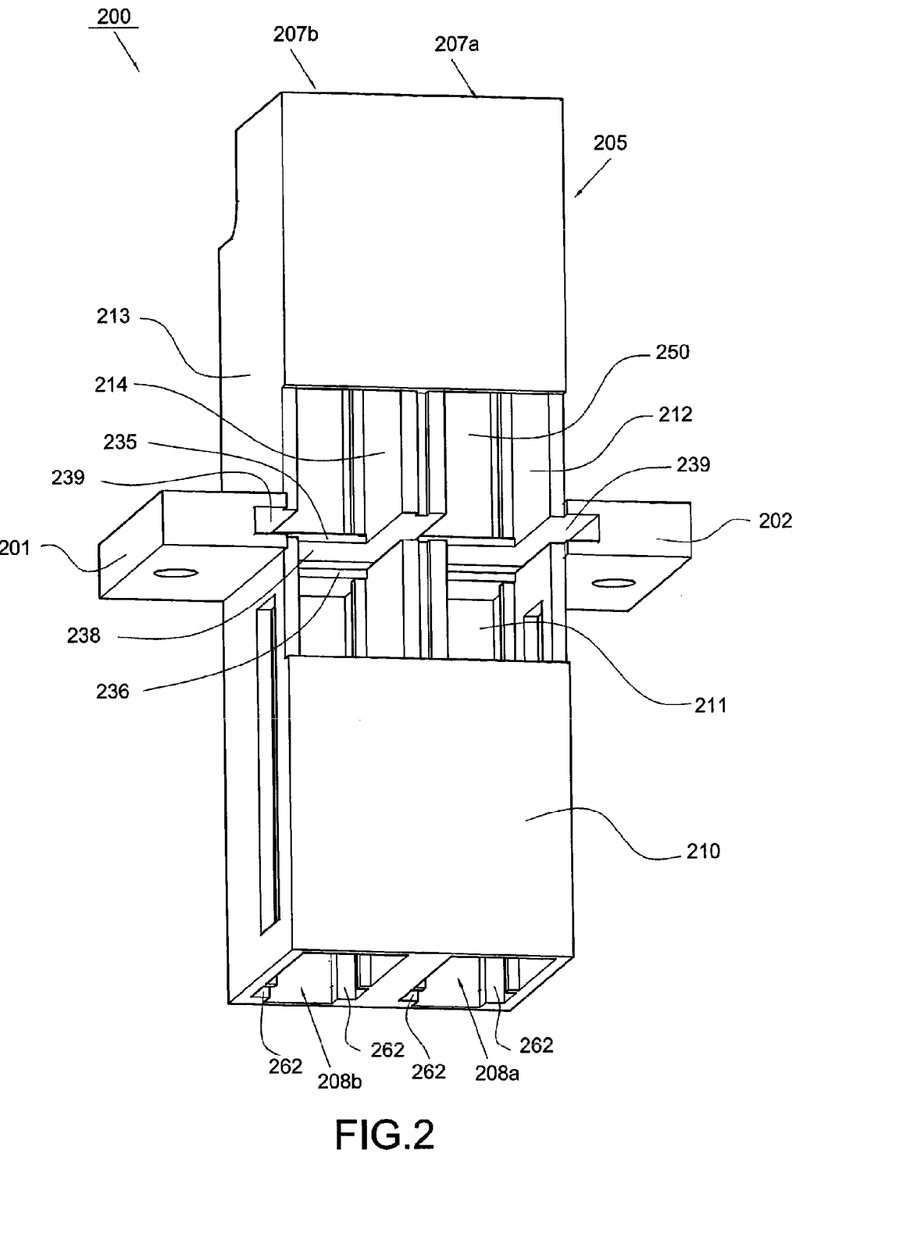
FIG. 2 is an elevated perspective view of the main body of the fiber adapter according to the present invention.
Figure 3:
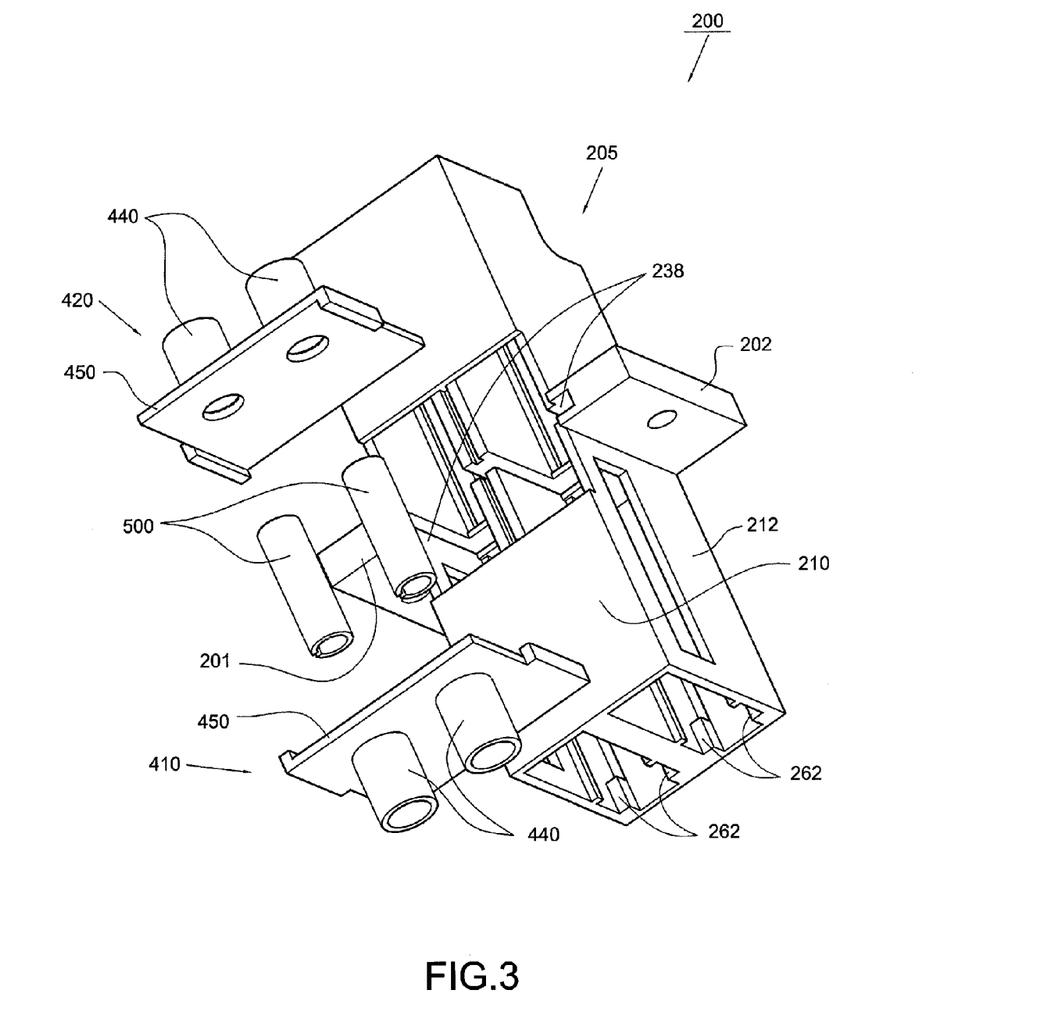
FIG. 3 is an exploded view of the fiber adapter of the present invention.
Figure 4:
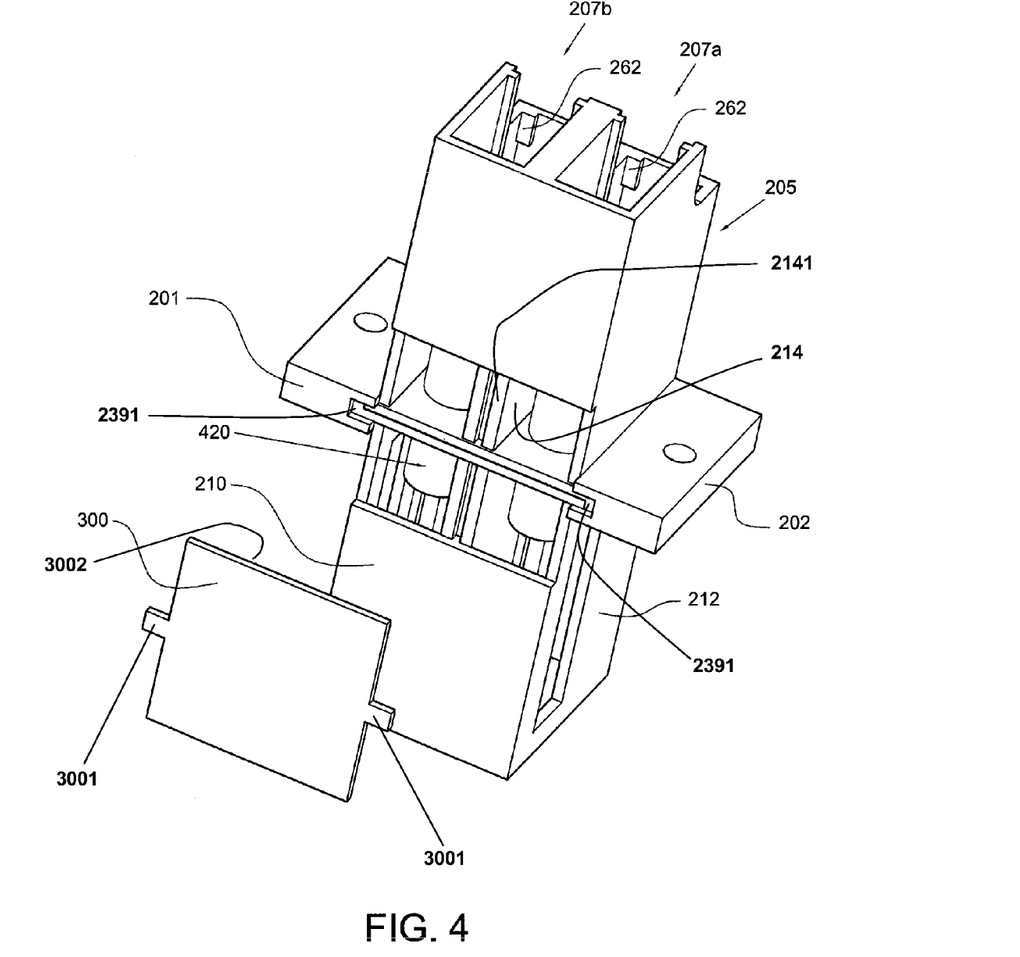
FIG. 4 is an elevated perspective view of the fiber adapter of the present invention, wherein the inner housing has been placed in the main body.

Referring to FIGS. 2 to 4, the duplex fiber adapter 200 of the present invention includes a unitary molded main body 205 and a cover 300. In the preferred embodiment, the main body 205 has an axial cavity defined by top side-wall 210, bottom side-wall 211, right side-wall 212 and left side-wall 213. The axial cavity is divided into two halves by a compartment wall 214 that is parallel to the right side-wall 212 and left side-wall 213 and connects with the top side-wall 210 and bottom side-wall 211. The half of the axial cavity defined by the top side-wall 210, bottom side-wall 211, compartment wall 214 and right side-wall 212 is named as the right axial cavity and the other half of the axial cavity defined by the top side-wall 210, bottom side-wall 211, compartment wall 214 and left side-wall 213 is named as the left axial cavity. The right axial cavity has opposing first right opening 207a and second right opening 208a and the left axial cavity has opposing first left opening 207b and second left opening 208b.

Located on the exterior of the main body 205 is a pair of tabs 201 and 202. One tab 202 is located on the right side-wall 212 and the other tab 201 is located on the left side wall 213. The tabs 201 and 202 are operative in supporting the adapter 100 on a surface. The inner cavity of the main body 205 contains a pair of parallel ridges 235 and 236 located on the inner surface of the bottom side-wall 211. The ridges 235 and 236 are perpendicular to the axial cavity of the main body 205 and divide the compartment wall 214 into two halves.

The ridges 235 and 236 define a groove 238 which is perpendicular to the axial cavity of the main body 205. The groove 238 is half way between the first openings 207a, 207b and second openings 208a, 208b of the main body 205. The width of the groove 238 is equal to the thickness of combined flanges 450 of the inner housing halves 410 and 420. The right side-wall 212 and left side-wall 213 each has a groove 239 that is collinear with the groove 238.

Located near the right opening 207a on the joint of the right side-wall 212 with the bottom side-wall 211 and on the joint of the compartment wall 214 with the bottom side-wall 211 are protrusions 262. The protrusions 262 are also located near the left opening 207b on the joint of the left side-wall 213 with the bottom side-wall 211 and on the joint of the compartment wall 214 with the bottom side-wall 211. Similarly, these protrusions 262 are also located near the openings 208a, 208b on the joints of the bottom side-wall 211 with the right side-wall 212, compartment wall 214 and left side-wall 213, respectively.

An access opening 250 is located on the top side-wall 210. The access opening 250 allows inner housing halves 410 and 420 to be inserted into the axial cavity of the main body 205 and also allows the main body 205 to be constructed by injection molding.

The inner housing halves 410 and 420 are identical. Each of the inner housing halves 410 and 420 is constructed of plastic by an injection molding process. Each half includes two hollow cylinders 440 and a rectan2ular flange 450 located at one end of the cylinder 440. Two halves 410 and 420 are connected at their respective flanges 450 respectively so as to define two common cylinders. Two flanges 450 define a thickness which is equal to the widths of the groove 238 and 239. The inner housing halves 410, 420 are placed in the main body 205 by aligning the flange 450 of the inner housing half 410 with collinear grooves 238 and 239 and sliding it into place within the main body 205. The other inner housing half 420 is inserted into the main body 205 in the same fashion.

The cylinders 440 of the inner housing halves 410 and 420 are coaxial in the main body 205 and define two common cylinders. Located in each of the common cylinders is a hollow sleeve 500 with a generally cylindrical shape. The cover 300 covers the access opening 250 and can be ultrasonically welded to the main body 205.

Figure 5A:
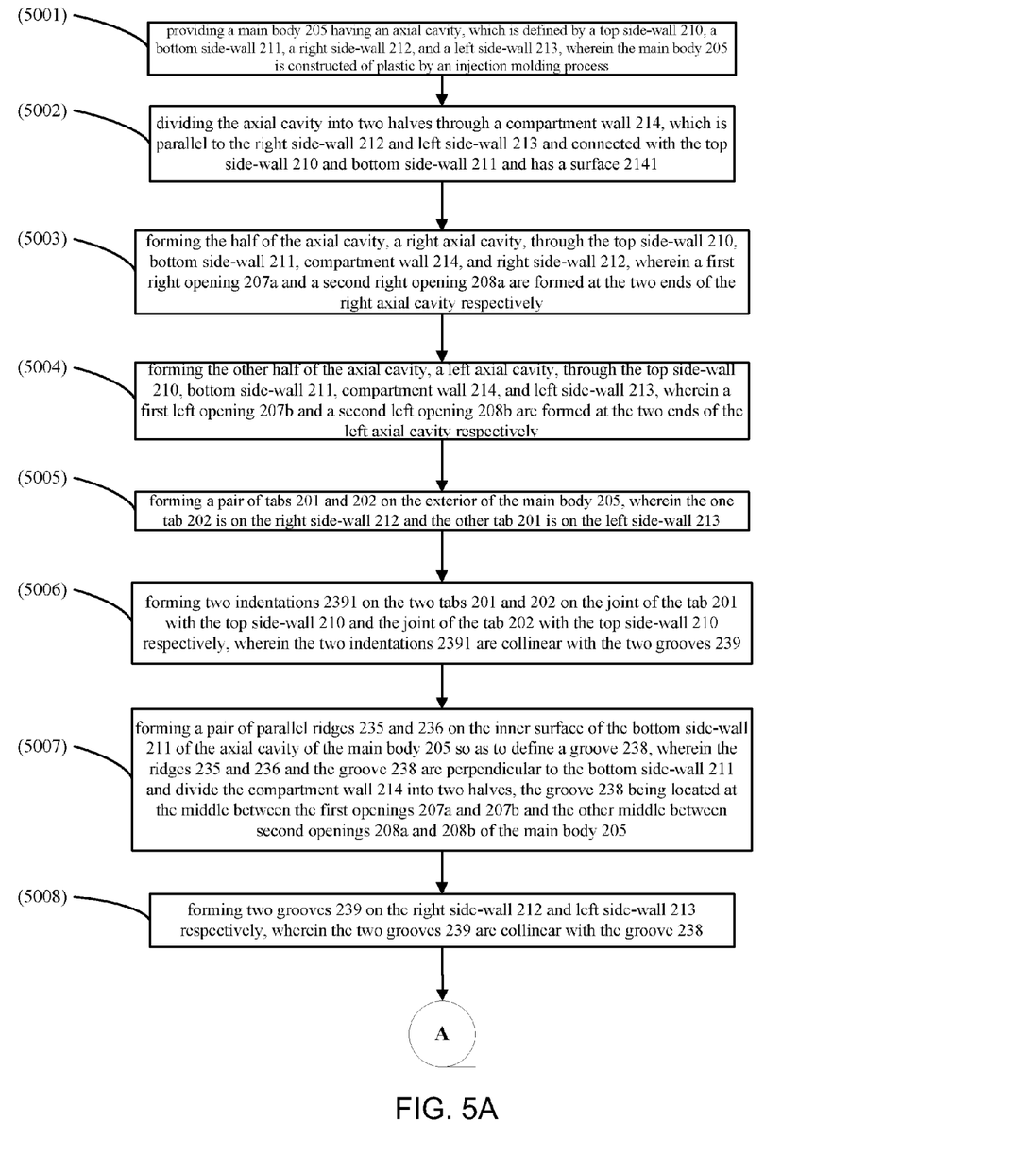
FIG. 5A and 5B (hereinafter referred to as FIG. 5) collectively are a flow chart of a method for manufacturing the one-piece LC type optical fiber adapter of the present invention.
Figure 5B:
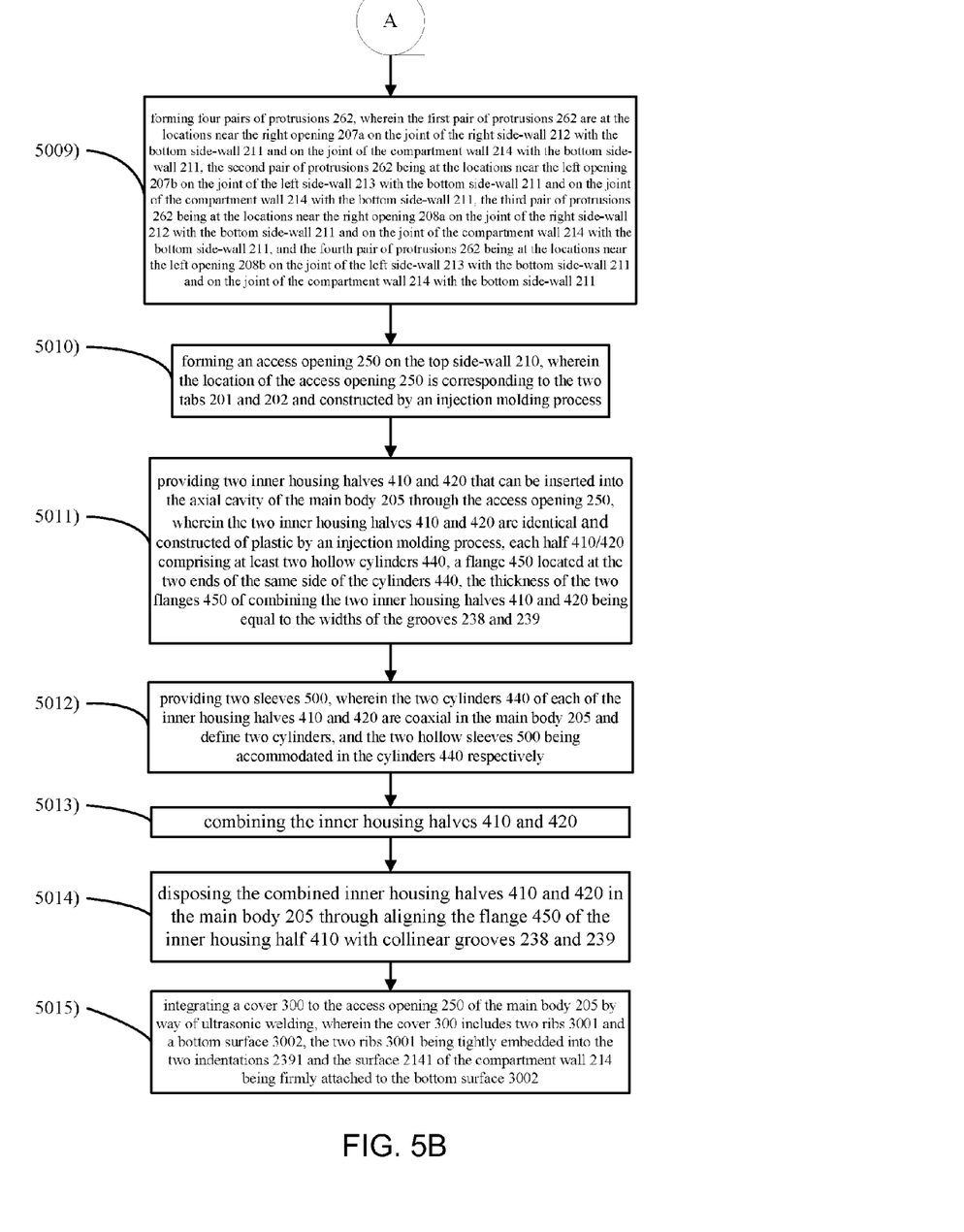

With reference to FIG. 5, which is a flow chart of a method for manufacturing the one-piece LC type optical fiber adapter of the present invention. The method includes the steps of:

(5001) providing a main body 205 having an axial cavity, which is defined by a top side-wall 210, a bottom side-wall 211, a right side-wall 212, and a left side-wall 213, wherein the main body 205 is constructed of plastic by an injection molding process;

(5002) dividing the axial cavity into two halves through a compartment wall 214, which is parallel to the right side-wall 212 and left side-wall 213 and connected with the top side-wall 210 and bottom side-wall 211 and has a surface 2141;

(5003) forming the half of the axial cavity, a right axial cavity, through the top side-wall 210, bottom side-wall 211, compartment wall 214, and right side-wall 212, wherein a first right opening 207a and a second right opening 208a are formed at the two ends of the right axial cavity respectively;

(5004) forming the other half of the axial cavity, a left axial cavity, through the top side-wall 210, bottom side-wall 211, compartment wall 214, and left side-wall 213, wherein a first left opening 207b and a second left opening 208b are formed at the two ends of the left axial cavity respectively;

(5005) forming a pair of tabs 201 and 202 on the exterior of the main body 205, wherein the one tab 202 is on the right side-wall 212 and the other tab 201 is on the left side-wall 213;

(5006) forming two indentations 2391 on the two tabs 201 and 202 on the joint of the tab 201 with the top side-wall 210 and the joint of the tab 202 with the top side-wall 210 respectively, wherein the two indentations 2391 are collinear with the two grooves 239;

(5007) forming a pair of parallel ridges 235 and 236 on the inner surface of the bottom side-wall 211 of the axial cavity of the main body 205 so as to define a groove 238, wherein the ridges 235 and 236 and the groove 238 are perpendicular to the bottom side-wall 211 and divide the compartment wall 214 into two halves, the groove 238 being located at the middle between the first openings 207a and 207b and the other middle between second openings 208a and 208b of the main body 205;

(5008) forming two grooves 239 on the right side-wall 212 and left side-wall 213 respectively, wherein the two grooves 239 are collinear with the groove 238;

(5009) forming four pairs of protrusions 262, wherein the first pair of protrusions 262 are at the locations near the right opening 207a on the joint of the right side-wall 212 with the bottom side-wall 211 and on the joint of the compartment wall 214 with the bottom side-wall 211, the second pair of protrusions 262 being at the locations near the left opening 207b on the joint of the left side-wall 213 with the bottom side-wall 211 and on the joint of the compartment wall 214 with the bottom side-wall 211, the third pair of protrusions 262 being at the locations near the right opening 208a on the joint of the right side-wall 212 with the bottom side-wall 211 and on the joint of the compartment wall 214 with the bottom side-wall 211, and the fourth pair of protrusions 262 being at the locations near the left opening 208b on the joint of the left side-wall 213 with the bottom side-wall 211 and on the joint of the compartment wall 214 with the bottom side-wall 211;

(5010) forming an access opening 250 on the top side-wall 210, wherein the location of the access opening 250 is corresponding to the two tabs 201 and 202 and constructed by an injection molding process;

(5011) providing two inner housing halves 410 and 420 that can be inserted into the axial cavity of the main body 205 through the access opening 250, wherein the two inner housing halves 410 and 420 are identical and constructed of plastic by an injection molding process, each half 410/420 including at least two hollow cylinders 440, a flange 450 being located at the two ends of the same side of the cylinders 440 and shaped as a rectangular member, the thickness of the two flanges 450 of combining the two inner housing halves 410 and 420 being equal to the widths of the grooves 238 and 239;

(5012) providing two sleeves 500, wherein the two cylinders 440 of each of the inner housing halves 410 and 420 are coaxial in the main body 205 and define two cylinders, and the two hollow sleeves 500 being accommodated in the cylinders 440 respectively;

(5013) combining the inner housing halves 410 and 420;

(5014) disposing the combined inner housing halves 410 and 420 in the main body 205 through aligning the flange 450 of the inner housing half 410 with collinear grooves 238 and 239; and (5015) integrating a cover 300 to the access opening 250 of the main body 205 by way of ultrasonic welding, wherein the cover 300 includes two ribs 3001 and a bottom surface 3002, the two ribs 3001 being tightly embedded into the two indentations 2391 and the surface 2141 of the compartment wall 214 being firmly attached to the bottom surface 3002, as shown in FIG. 4.

In operation the connector 100 is inserted into the main body 205 from, for example, the first right opening 207a. The shoulders 121 positioned on the opposite sides of the tab 126 of the spring latch 120 are pushed by the protrusions 262 to cause the spring latch 120 to be deflected downward during the insertion into the main body 205. The ferrule 140 of the connector 100 is inserted into one end of the hollow sleeve 500 in the right axial cavity. When the shoulders 121 pass over the protrusions 262J the spring latch 120 is then returned to its original position by its own restorative force to have the shoulders 121 moved upward to position behind the protrusions 262. The protrusions 262 can stop the backward movement of the shoulders 121 to prevent the connector 100 from being pulled out from the adapter 200. Another connector 100 can be inserted into the main body 205 from the second right opening 208a in the same manner to have its ferrule 140 to be inserted into the other end of the sleeve 500 in the right axial cavity. The end face of the ferrule 140 will be brought into contact with that of the previous ferrule 140. Similarly, two connectors 100 can be inserted into the main body 205 from the first left opening 207b and the second left opening 208b respectively to optically couple with each other.

In addition to duplex fiber adapter, the fiber adapter of the present invention can also be designed to couple four pairs of connectors (not shown in the figure). More specifically, the axial cavity in the main body of the adapter is divided into four parts by three parallel compartment walls. Four connectors can be inserted into the front ends of the four parts of the axial cavity respectively in the above-described manner. Similarly, another four connectors can be inserted into the rear ends of the four parts of the axial cavity to couple with the opposite connectors, respectively. Since the structure of this adapter is substantially identical to that of the adapter 200, any further illustrations of such adapter are omitted herein.

Since the main body of the fiber adapter according to the present invention is unitary, the prior art problem that the stresses cause the two halves of the adapter to separate from each other after time can be avoided.

Although the invention has been disclosed and illustrated with reference to particular embodiments, the principles involved are susceptible for use in numerous other embodiments that will be apparent to persons skilled in the art. This invention is, therefore, to be limited only as indicated by the scope of the appended claims.

What is claimed is:

1. A method for manufacturing a one-piece LC type optical fiber adapter comprising the step of:
   (1) providing a main body having an axial cavity, which is defined by a top side-wall, a bottom side-wall, a right side-wall, and a left side-wall;
   (2) dividing the axial cavity into two halves through a compartment wall, which is parallel to the right side-wall and left side-wall and connected with the top side-wall and bottom side-wall and has a surface;

(3) forming the half of the axial cavity, a right axial cavity, through the top side-wall, bottom side-wall, compartment wall, and right side-wall, wherein a first right opening and a second right opening are formed at the two ends of the right axial cavity respectively;

(4) forming the other half of the axial cavity, a left axial cavity, through the top side-wall, bottom side-wall, compartment wall, and left side-wall, wherein a first left opening and a second left opening are formed at the two ends of the left axial cavity respectively;

(5) forming a pair of tabs on the exterior of the main body, wherein the one tab is on the right side-wall and the other tab is on the left side-wall;

(6) forming a pair of parallel ridges on the inner surface of the bottom side-wall of the axial cavity of the main body so as to define a groove, wherein the ridges and the groove are perpendicular to the bottom side-wall and divide the compartment wall into two halves, the groove being located at the middle between the first openings and the other middle between second openings of the main body;

(7) forming two grooves on the right side-wall and left side-wall respectively, wherein the two grooves are collinear with the groove;

(8) forming four pairs of protrusions, wherein the first pair of protrusions are at the locations near the first right opening on the joint of the right side-wall with the bottom side-wall and on the joint of the compartment wall with the bottom side-wall, the second pair of protrusions being at the locations near the first left opening on the joint of the left side-wall with the bottom side-wall and on the joint of the compartment wall with the bottom side-wall, the third pair of protrusions being at the locations near the second right opening on the joint of the right side-wall with the bottom side-wall and on the joint of the compartment wall with the bottom side-wall, and the fourth pair of protrusions being at the locations near the second left opening on the joint of the left side-wall with the bottom side-wall and on the joint of the compartment wall with the bottom side-wall;

(9) forming an access opening on the top side-wall, wherein the location of the access opening is corresponding to the two tabs;

(10) providing two inner housing halves that can be inserted into the axial cavity of the main body through the access opening, wherein the two inner housing halves are identical, each half comprising at least two hollow cylinders, a flange located at the two ends of the same side of the cylinders, the thickness of the two flanges of combining the two inner housing halves being equal to the widths of the grooves;

(11) providing two hollow sleeves, wherein the two cylinders of each of the inner housing halves are coaxial in the main body and define two cylinders, and the two hollow sleeves being accommodated in the cylinders respectively;

(12) combining the inner housing halves;

(13) disposing the combined inner housing halves in the main body through aligning the flange of the inner housing half with collinear grooves; and (14) integrating a cover to the access opening of the main body, wherein the cover comprises a bottom surface, the surface of the compartment wall being firmly attached to the bottom surface.

2. The method for manufacturing the one-piece LC type optical fiber adapter according to claim 1, wherein the main body of step (11) is constructed of plastic by an injection molding process.

3. The method for manufacturing the one-piece LC type optical fiber adapter according to claim 1 further comprising a step (51) after step (5), and the step (51) being of: forming two indentations on the two tabs on the joint of the tab with the top side-wall and the joint of the tab with the top side-wall respectively, wherein the two indentations are collinear with the two grooves.

4. The method for manufacturing the one-piece LC type optical fiber adapter according to claim 1, wherein the access opening of step (9) is constructed by an injection molding process.

5. The method for manufacturing the one-piece LC type optical fiber adapter according to claim 1, wherein each of the inner housing halves of step (10) is constructed of plastic by an injection molding process.

6. The method for manufacturing the one-piece LC type optical fiber adapter according to claim 1, wherein the flange of step (10) is shaped as a rectangular member.

7. The method for manufacturing the one-piece LC type optical fiber adapter according to claim 3, wherein the cover has two ribs, which are tightly embedded into the two indentations in step (14).

8. The method for manufacturing the one-piece LC type optical fiber adapter according to claim 7, wherein the integration of the cover and the access opening of the main body is by way of ultrasonic welding.

* * * * *